(12) United States Patent
Nishida et al.

(10) Patent No.: US 6,640,570 B2
(45) Date of Patent: Nov. 4, 2003

(54) VEHICLE AIR CONDITIONER WITH HEAT PUMP REFRIGERANT CYCLE

(75) Inventors: Shin Nishida, Anjo (JP); Nobuharu Kakehashi, Ottobrunn (JP); Masami Taguchi, Ottobrunn (JP); Noriyuki Miyazaki, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/253,289

(22) Filed: Sep. 24, 2002

(65) Prior Publication Data
US 2003/0056531 A1 Mar. 27, 2003

(30) Foreign Application Priority Data
Sep. 27, 2001 (JP) .......................... 2001-297275
Nov. 12, 2001 (JP) .......................... 2001-346241

(51) Int. Cl.[7] ............................................ B60H 1/32
(52) U.S. Cl. .................. 62/244; 165/42; 165/43; 237/12.3 A; 237/12.3 B; 454/93
(58) Field of Search ........................ 62/244; 165/42, 165/43; 454/93, 121, 127; 237/12.3 A, 12.3 B

(56) References Cited

U.S. PATENT DOCUMENTS

| | | | | |
|---|---|---|---|---|
| 4,690,039 A | * | 9/1987 | Uchida | 454/126 |
| 5,062,352 A | * | 11/1991 | Ostrand | 454/121 |
| 5,299,431 A | * | 4/1994 | Iritani et al. | 62/243 |
| 6,072,153 A | * | 6/2000 | Aoki et al. | 219/202 |
| 6,076,593 A | * | 6/2000 | Takagi et al. | 165/43 |
| 6,131,652 A | * | 10/2000 | Ito et al. | 165/204 |
| 6,311,763 B1 | * | 11/2001 | Uemura et al. | 165/43 |
| 6,330,909 B1 | * | 12/2001 | Takahashi et al. | 165/202 |
| 2001/0035286 A1 | | 11/2001 | Kobayashi et al. | |

FOREIGN PATENT DOCUMENTS

| | | |
|---|---|---|
| JP | 7-266862 | 10/1995 |
| JP | 8-258546 | 10/1996 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

In a vehicle air conditioner, an interior heat exchanger of a heat pump refrigerant cycle is disposed in an air conditioning case to heat and cool air passing therethrough. The air conditioning case has therein a bypass passage through which air flows to a downstream side while bypassing the interior heat exchanger. In a defogging mode, air mainly passing through the bypass passage is blown toward a windshield of the passenger compartment, and air mainly passing through the interior heat exchanger is blown toward a lower side in the passenger compartment. Accordingly, even by setting the heating capacity of the interior heat exchanger at a maximum degree, it can restrict a windshield from being fogged in the defogging mode.

20 Claims, 12 Drawing Sheets

→ COOLING
---→ HEATING

VEHICLE AIR CONDITIONER WITH HEAT PUMP REFRIGERANT CYCLE

CROSS REFERENCE TO RELATED APPLICATION

This application is based on Japanese Patent Applications No. 2001-297275 filed on Sep. 27, 2001, and No. 2001-346241 filed on Nov. 12, 2001, the disclosure of which is incorporated herein by reference.

BACKGROUND OF THE INVENTION

1. Field of the Invention

The present invention relates to a vehicle air conditioner having a heat pump refrigerant cycle which can switch one of a cooling operation and a heating operation.

2. Description of Related Art

In a heat pump refrigerant cycle capable of switching one of a cooling operation and a heating operation, decompressed refrigerant is evaporated in an interior heat exchanger by absorbing heat from air to be blown into a passenger compartment, and the absorbed heat is radiated to an outside air in an exterior heat exchanger, when the cooling operation for cooling the passenger compartment is performed. On the other hand, when the heating operation for heating the passenger compartment is performed, decompressed refrigerant is evaporated in the exterior heat exchanger by absorbing heat from outside air, and absorbed heat is radiated to air to be blown into the passenger compartment.

In this heat pump refrigerant cycle, during the cooling operation or a defrosting operation, because the interior heat exchanger is used as a cooling unit for cooling air, condensed water adheres on the surface of the interior heat exchanger. Accordingly, when the operation of the heat pump refrigerant cycle is switched from the cooling operation or the defrosting operation to the heating operation, the interior heat exchanger is heated, and condensed water adhering on the surface of the interior heat exchanger is evaporated. In this case, air having a high relative humidity is blown into the passenger compartment, and a windshield is readily fogged.

To overcome this problem, the applicant proposes a vehicle air conditioner in U.S. patent Application Publication No. 2001-0035286. In the vehicle air conditioner, when the operation of a refrigerant cycle is switched from the cooling operation or the defrosting operation to the heating operation, heating capacity of the interior heat exchanger is set smaller so that condensed water adhering on the surface of the interior heat exchanger is slowly evaporated. However, while the heating capacity of the interior heat exchanger is set smaller, a sufficient heating cannot be obtained in the passenger compartment.

SUMMARY OF THE INVENTION

In view of the above-described problems, it is an object of the present invention to provide a vehicle air conditioner which prevents a windshield from being fogged while restricting heating capacity from becoming smaller.

According to the present invention, in a vehicle air conditioner, a heat exchanger of a heat pump refrigerant cycle is disposed in an air conditioning case, for performing a heat exchange with air to be blown into a passenger compartment of the vehicle. The heat exchanger is disposed in the air conditioning case to form a bypass passage through which air flows to a downstream side while bypassing the heat exchanger. When a defogging mode is set in the vehicle air conditioner, air mainly passing through the bypass passage is blown toward a first area in the passenger compartment, near a windshield of the vehicle, and air mainly passing through the heat exchanger is blown toward a second area in the passenger compartment, separated from the windshield. Here, the defogging mode is generally set when it is determined that the windshield tends to be fogged. For example, when the operation of the heat pump refrigerant cycle is switched from the cooling operation, a defrosting operation or a dehumidifying operation to a heating operation, the defogging mode is set. Accordingly, even when the heating capacity of the heat exchanger is made maximum, by setting the defogging mode, it can restrict air having a large water vapor from being blown toward the windshield. Thus, it can restrict the windshield from being fogged while restricting heating capacity for heating the passenger compartment from becoming smaller.

Preferably, at least in the defogging mode, outside air outside the passenger compartment is mainly introduced into the bypass passage. Because outside air having low humidity can be blown toward the windshield through the bypass passage, it can further prevent the windshield from being fogged.

In the vehicle air conditioner, a partition member is disposed for partitioning the air passage within the air conditioning case into a first passage through which outside air outside the passenger compartment flows into the passenger compartment, and a second passage through which inside air inside the passenger compartment flows into the passenger compartment. In addition, the bypass passage is provided in the first passage. Accordingly, the heating capacity for heating the passenger compartment can be increased, while it can further prevent the windshield from being fogged.

Preferably, in the defogging mode, at least a part of air passing through the heat exchanger is discharged outside the passenger compartment from the air conditioning case, at least for a predetermined short time. Therefore, it can prevent air having a large water vapor from being introduced into the passenger compartment. In this case, the air passing through the interior heat exchanger, having the larger water vapor, can be discharged outside the passenger compartment from the air conditioning case through a drain port for draining water in the air conditioning case to an outside, or through a discharge port different from the drain port, in the defogging mode.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
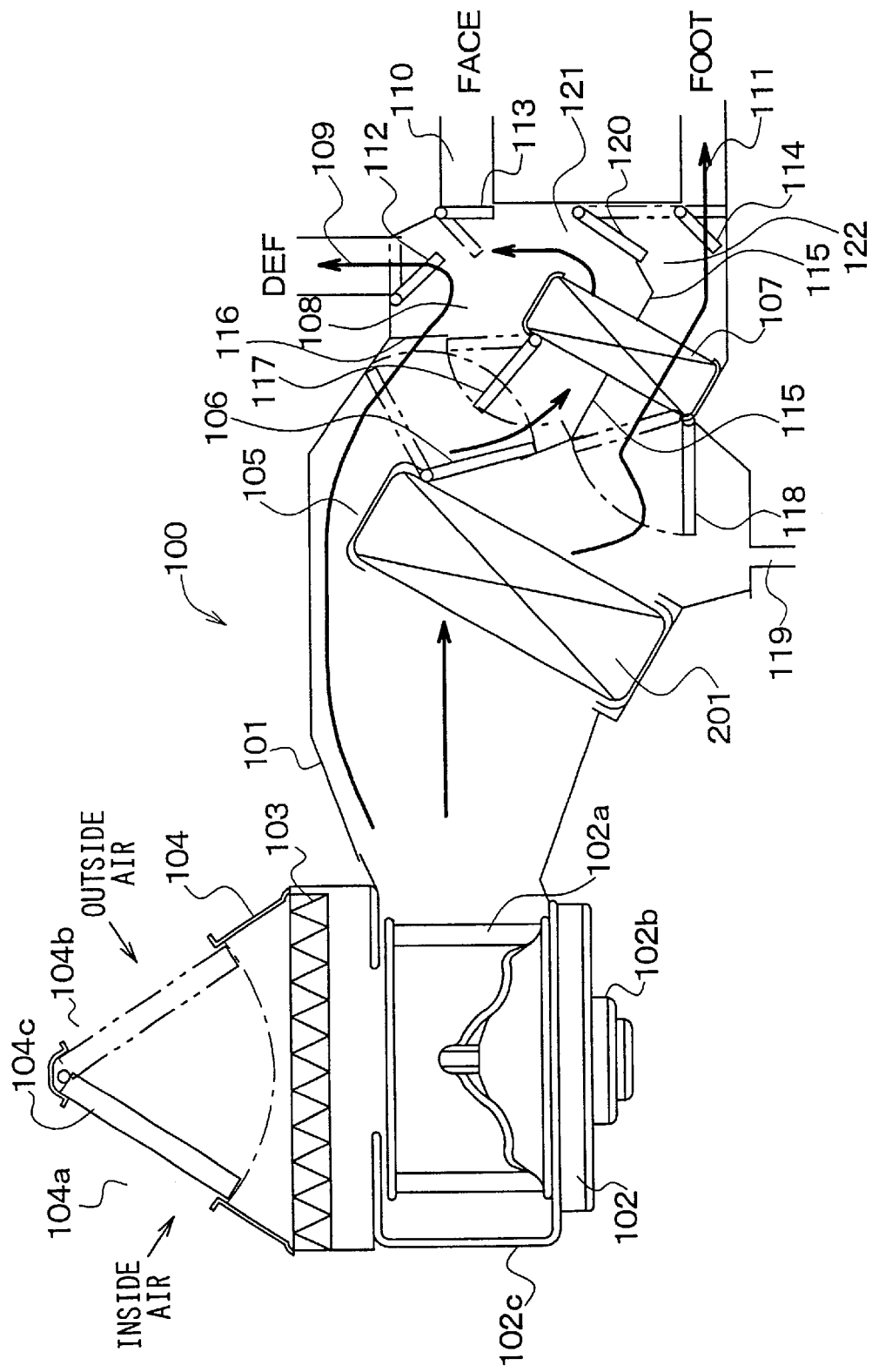
FIG. 1 is a schematic diagram of an air conditioner for a vehicle, in a defogging mode, according to a first embodiment of the present invention.

A first embodiment of the present invention will be now described with reference to FIGS. 1–4. As shown in FIG. 1, a vehicle air conditioner 100 includes an air conditioning case 101 defining an air passage through which air is blown into a passenger compartment. An interior heat exchanger 201 of a heat pump refrigerant cycle 100 is disposed within the air conditioning case 101. A blower 102 for blowing air into the passenger compartment through the air passage is disposed at an upstream air side of the air conditioning case 101. Further, a filter 103, for filtering dust contained in air to be supplied to the blower 102, and an inside/outside air switching box 104 are disposed at an upstream air side of the blower 102. The inside/outside air switching box 104 is disposed to switch one introduction mode between an inside air introduction mode where inside air inside the passenger compartment is introduced, and an outside air introduction mode where outside air outside the passenger compartment is introduced.

The blower 102 includes a centrifugal fan 102a for blowing air, an electrical motor 102b for rotating the centrifugal fan 102a, and a scroll casing 102c for accommodating the fan 102a and for forming a blower air passage. The inside/outside air switching box 104 includes an inside air introduction port 104a for introducing inside air (i.e., air inside the passenger compartment), an outside air introduction port 104b for introducing outside air (i.e., air outside the passenger compartment), and an inside/outside air switching door 104c for opening and closing the introduction ports 104a, 104b.

The interior heat exchanger 201 is for heating and cooling air blown into the passenger compartment. That is, by performing a heat exchange between refrigerant of the heat pump refrigerant cycle and air to be blown into the passenger compartment in the interior heat exchanger 201, air passing through the interior heat exchanger 201 is cooled and heated.

The interior heat exchanger 201 is disposed in the air conditioning case 101 to form a first bypass passage 105 through which air blown from the blower 102 bypasses the interior heat exchanger 201. A bypass door 106 is disposed in the air conditioning case 101, for opening and closing the first bypass passage 105 and for guiding air in a predetermined direction.

A heater 107, for heating air to be blown into the passenger compartment using engine-cooling water as a heating source, is disposed in the air conditioning case 101 at a downstream air side of the interior heat exchanger 201 and the first bypass passage 105. Further, the heater 107 is disposed in the air conditioning case 101 to form a second bypass passage 108 through which air flows toward a downstream side while bypassing the heater 107. The second bypass passage 108 is provided at the side of the first bypass passage 105.

Plural air outlet openings 109–111 through which air is blown into the passenger compartment is provided in the air conditioning case 101 at a downstream air side of the heater 107 and the second bypass passage 108. The plural air outlet openings 109–111 include a defroster opening 109 through which air is blown toward a windshield of the vehicle, a face opening 110 through which air is blown toward the upper side of a passenger in the passenger compartment, and a foot opening 111 through which air is blown toward the lower side of the passenger in the passenger compartment. The air outlet openings 109–111 are opened and closed by air outlet mode switching doors 112–114, respectively.

A first guide wall 115 for partitioning an air passage of the heater core 107 into two first and second passage parts is disposed, and is also used for guiding air flowing from the side of the first and second bypass passages 105, 108 toward the defroster opening 109 and the face opening 110. A second guide wall 116 is disposed to define the second bypass passage 108, and the second bypass passage 108 is opened and closed by a first air mixing door 117. In addition, the second guide wall 116 is disposed to guide air flowing from the first bypass passage 105 toward the heater core 107, together with the first air mixing door 117. A second air mixing door 118 is disposed to open and close the second passage part of the heater 107, on the lower side of the first guide wall 115. On the other hand, the first air mixing door 117 is disposed to open and close the first passage part of the heater 107 adjacent to the second bypass passage 108, and the second bypass passage 108. When the second air mixing door 118 closes the second passage part of the heater 107, air after passing through the interior heat exchanger 201 is guided to a side of the drain port 119. The drain port 119 is for discharging water in the air conditioning case 101, such as rain water flowing from outside air or condensed water generated on the interior heat exchanger 201.

A downstream air passage of the heater 107 is partitioned by the first guide wall 115 into a first space 121 and a second space 122. A communication between the first space 121 and the second space 122 can be adjusted by a partition door 120.

Figure 2:
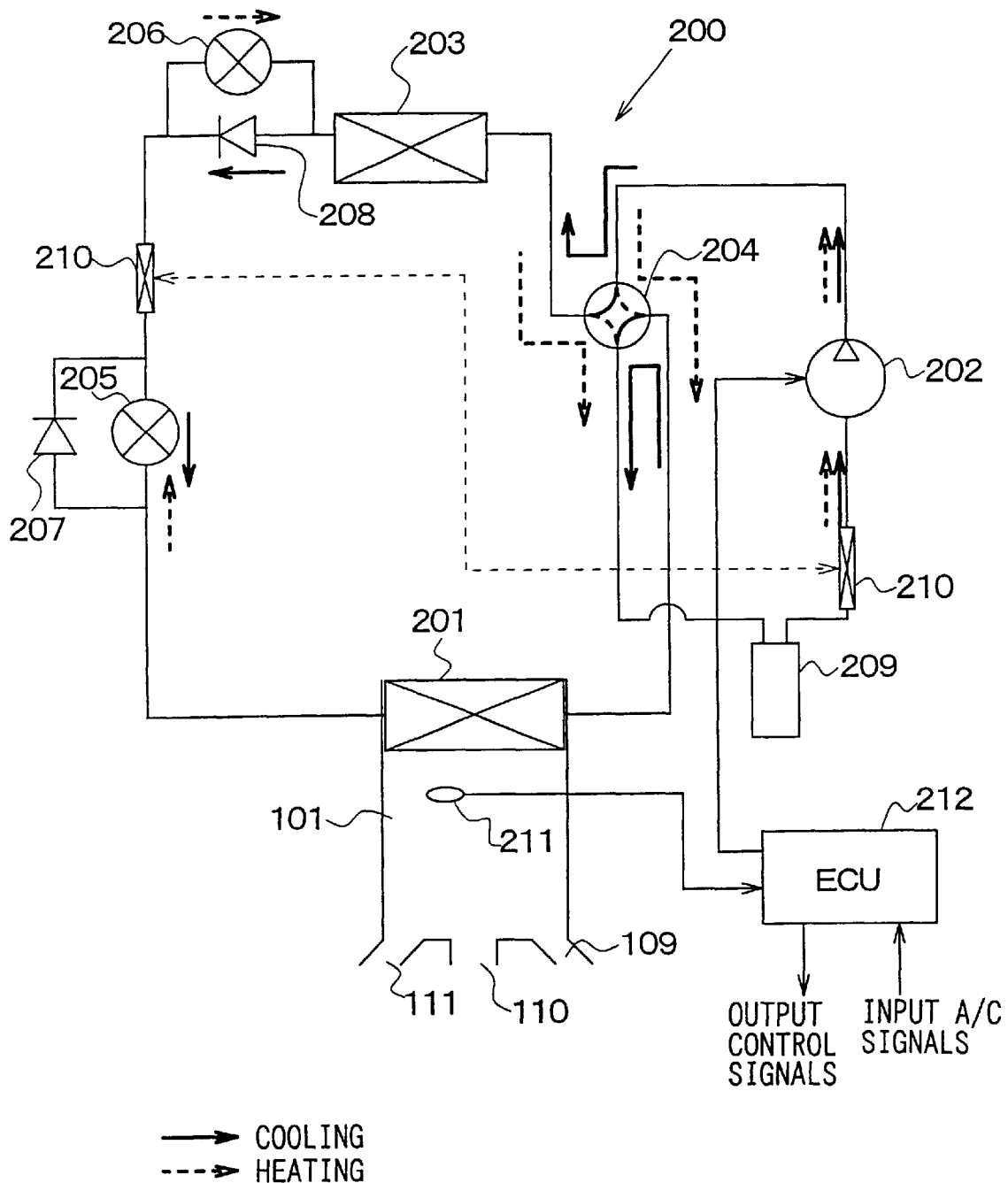
FIG. 2 is a schematic diagram of a heat pump refrigerant cycle of the vehicle air conditioner according to the first embodiment.

Next, the heat pump refrigerant cycle 200 will be now described with reference to FIG. 2. A compressor 202 sucks and compresses refrigerant by using electrical power, and an exterior heat exchanger 203 performs a heat exchange between outside air and refrigerant. A switching valve 204 is disposed to switch one of a first circulation where refrigerant discharged from the compressor 202 flows toward the interior heat exchanger 201, and a second circulation where the refrigerant discharged from the compressor 202 flows toward the exterior heat exchanger 203.

A first decompression unit 205 decompresses refrigerant flowing from the exterior heat exchanger 203, only in a cooling operation, a dehumidifying operation or a defrosting operation. A first check valve 207 is disposed so that refrigerant bypasses the first decompression unit 205 only in a heating operation. On the other hand, a second decompression unit 206 decompresses refrigerant flowing from interior heat exchanger 201 in the heating operation. A second check valve 208 is disposed so that refrigerant bypasses the second decompression unit 206 in the cooling operation, in the dehumidifying operation and in the defrosting operation.

An accumulator 209 is disposed at a refrigerant suction side of the compressor 202. Refrigerant flowing into the accumulator 209 is separated into gas refrigerant and liquid refrigerant, so that the separated liquid refrigerant is stored in the accumulator 209 and the separated gas refrigerant is introduced into the refrigerant suction side of the compressor 202. An inner heat exchanger 210 is disposed to perform a heat exchange between the refrigerant to be supplied from the accumulator 209 to the compressor 202 and a high-pressure side refrigerant in the heat pump refrigerant cycle 200.

A temperature sensor 211 detects an air temperature immediately after passing through the interior heat exchanger 201. An electronic control unit (ECU) 212 controls a rotation speed of the compressor 202, each operation of the doors 104c, 106, 112–114, 117, 118 and 120 provided in the air conditioning case 101, based on sensor signals and air-conditioning input signals, in accordance with a pre-set control program. The sensor signals are signals from the temperature sensor 211, an inside air temperature sensor, an outside air temperature sensor, a sunlight sensor and the like. The air-conditioning input signals include a set signal set by a passenger in the passenger compartment.

Next, operation of the air conditioner 100 including the heat pump refrigerant cycle 200 will be now described.

First, when the cooling operation, the dehumidifying operation or the defrosting operation is set, in the heat pump refrigerant cycle 200, refrigerant circulates in this order of the compressor 202, the switching valve 204, the exterior heat exchanger 203, the second check valve 208, the inner heat exchanger, the first decompression unit 205, the interior heat exchanger 201, the switching valve 204, the accumulator 209, the inner heat exchanger 210 and the compressor 202. Accordingly, refrigerant decompressed in the first decompression unit 205 is evaporated in the interior heat exchanger 201 by absorbing heat from air, and the absorbed heat of the refrigerant is radiated to outside in the exterior heat exchanger 203. When a dehumidifying/heating operation is set, air cooled and dehumidified in the interior heat exchanger 201 is heated by the heater 107.

On the other hand, when the heating operation is set, in the heat pump refrigerant cycle 200, refrigerant circulates in this order of the compressor 202, the switching valve 204, the interior heat exchanger 201, the first check valve 207, the inner heat exchanger 210, the second decompression unit 206, the exterior heat exchanger 203, the switching valve 204, the accumulator 209, the inner heat exchanger 210 and the compressor 202. Accordingly, refrigerant decompressed in the second decompression unit 206 is evaporated in the exterior heat exchanger 203 by absorbing heat from outside air, and the absorbed heat and heat corresponding to the compression operation of the compressor 202 is radiated to air to be blown into the passenger compartment in the interior heat exchanger 201. In the case, the heater 107 can be also operated to heat the air together with the heating operation of the interior heat exchanger 201, so that the heating capacity can be further increased.

Next, the door operation within the air conditioning case 101 will be now described.

Figure 3:
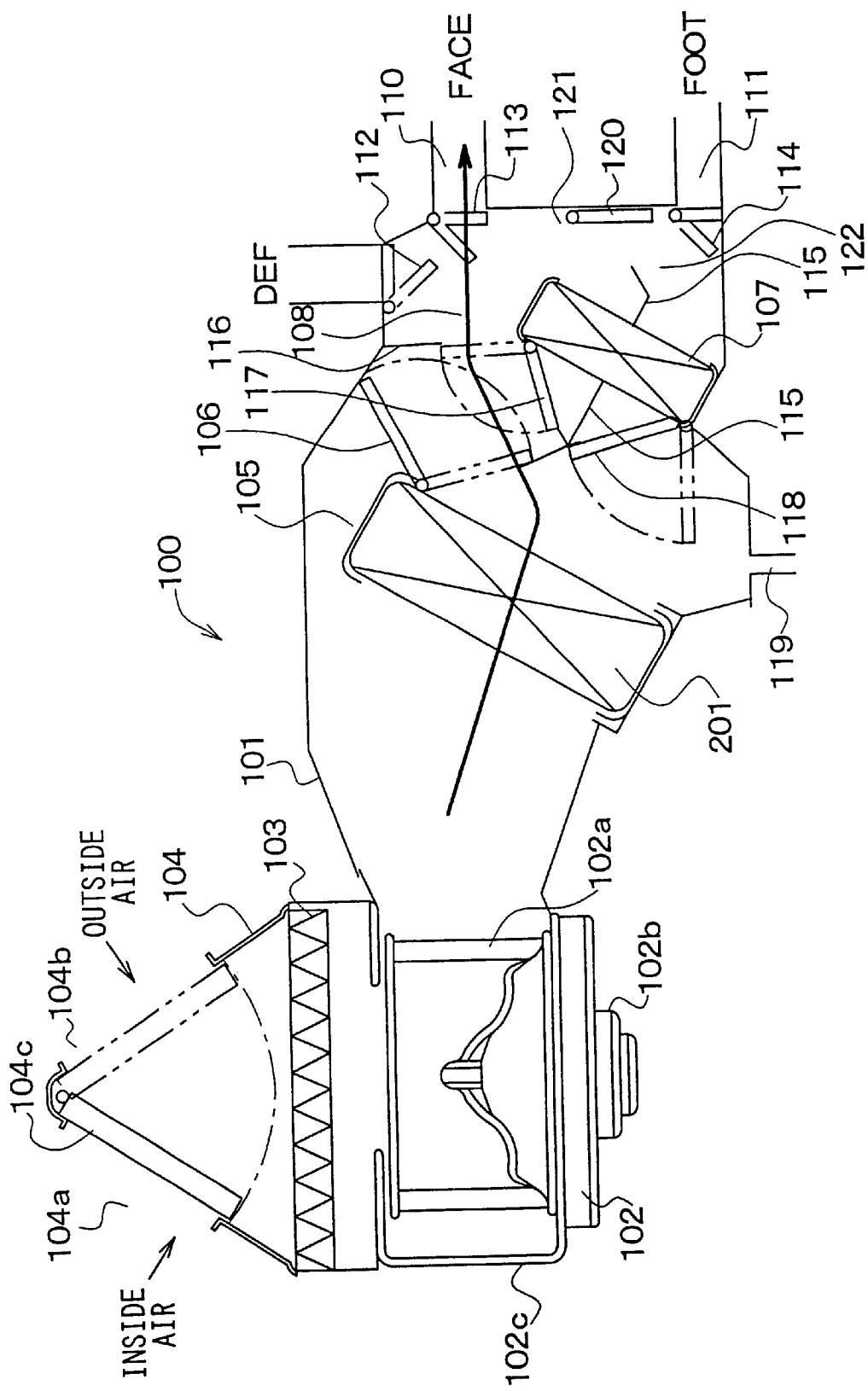
FIG. 3 is a schematic diagram of the vehicle air conditioner in a cooling operation according to the first embodiment.

First, in the cooling operation, the dehumidifying operation or the defrosting operation, as shown in FIG. 3, the first bypass passage 105 is closed by the bypass door 106. Therefore, air cooled and dehumidified in the interior heat exchanger 201 is blown into the passenger compartment through the face opening 110, for example. In this case, the temperature of air blown into the passenger compartment can be controlled by controlling the cooling capacity of the interior heat exchanger 201, due to the control of the rotation speed of the compressor 202. However, in the dehumidifying operation, the temperature of air blown into the passenger compartment can be controlled by controlling the operating degrees of the first and second air mixing doors 117, 118. That is, by adjusting the opening degrees of the first and second air mixing doors 117, 118, a ratio between a flow amount of air passing through the heater 107 and a flow amount of air passing through the second bypass passage 108 is adjusted so that the temperature of air blown into the passenger compartment can be adjusted.

Figure 4:
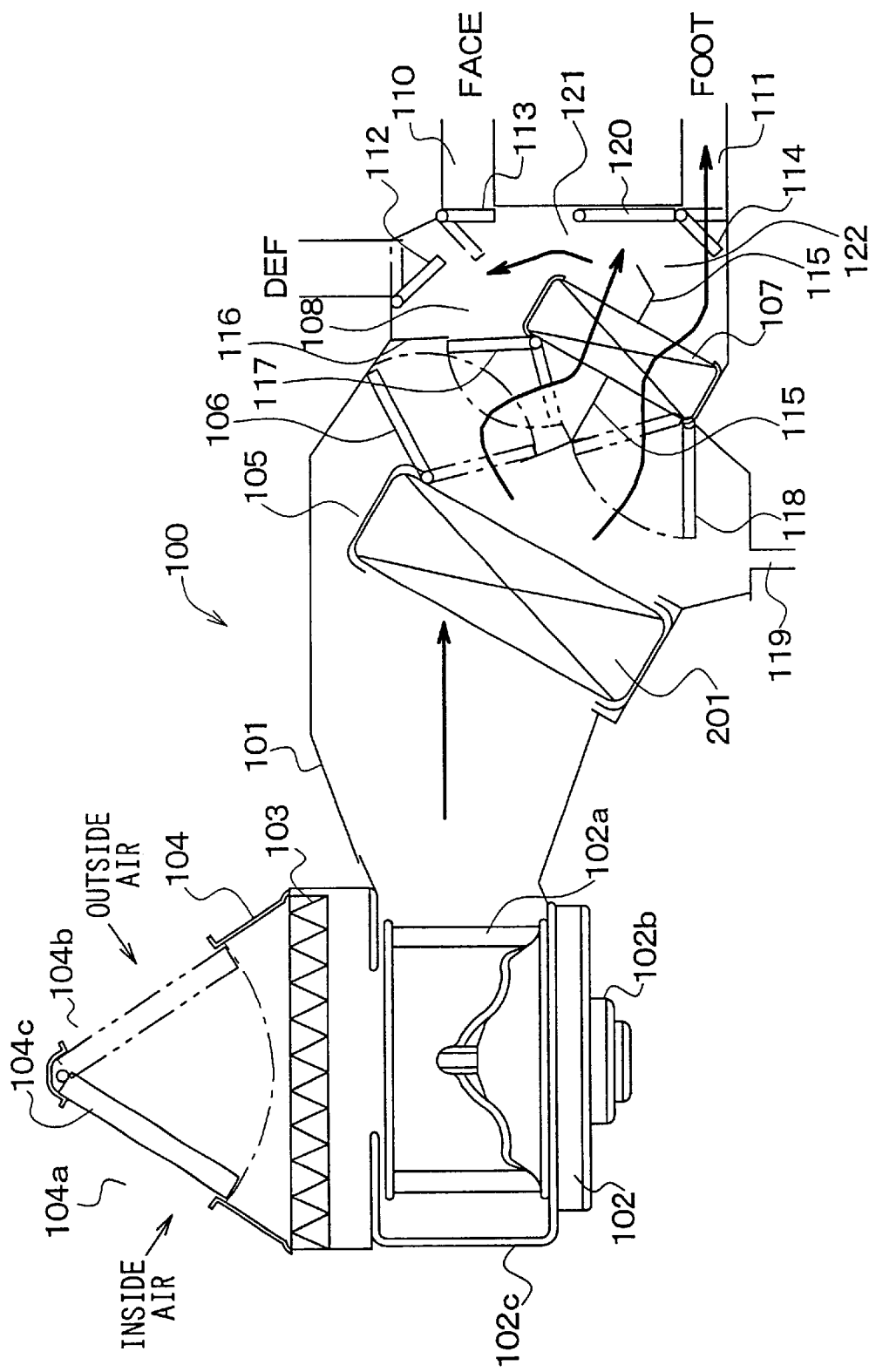
FIG. 4 is a schematic diagram of the vehicle air conditioner in a heating operation according to the first embodiment.

On the other hand, in the heating operation, as shown in FIG. 4, the first bypass passage 105 is closed by the bypass door 106. Therefore, air heated in the interior heat exchanger 201 is blown into the passenger compartment through the foot opening 111 and the defroster opening 109, as shown in FIG. 4. In this case, the temperature of air blown into the passenger compartment can be controlled by controlling the heating capacity of the interior heat exchanger 201, due to the control of the rotation speed of the compressor 202. However, in the heating operation, the heating capacity of the passenger compartment can be supplemented by controlling the ratio between the flow amount of air passing through the heater 107 and the flow amount of air passing through the second bypass passage 108. In the example shown in FIG. 4, the second bypass passage 108 is closed, and all air flowing from the interior heat exchanger 201 passes through the heater 107 to be re-heated. Accordingly, FIG. 4 shows the maximum heating state in the heating operation.

In the heating operation shown in FIG. 4, the partition door 120 is opened so that the first passage 121 and the second passage 122 communicate with each other. However, in the heating operation, the partition door 120 can be operated to partition the first passage 121 and the second passage 122 from each other.

When the operation is switched from the cooling operation or the dehumidifying operation to the heating operation, or when the operation is switched from the cooling operation, the dehumidifying operation or the defrosting operation to an air blowing operation where air is blown while the operation of the compressor 202 is stopped, it is determined that the windshield tends to be fogged, and a defogging mode is set as shown in FIG. 1.

In the first embodiment, when the operation is switched from the cooling operation or the dehumidifying operation to the heating operation, or when the operation is switched from the cooling operation, the dehumidifying operation or the defrosting operation to the air blowing operation, the defogging mode is automatically performed for a predetermined time. However, the defogging mode can be manually set by a passenger in the passenger compartment.

In the defogging mode, the outside air introduction mode for introducing outside air can be set, and the first bypass passage 105 is fully opened so that the outside air, flowing through the first bypass passage 105 while bypassing the interior heat exchanger 201, is introduced into the passenger compartment from the defroster opening 109. On the other hand, in the defogging mode, air after passing through the interior heat exchanger 201 is supplied to the passenger compartment from the foot opening 111.

In the defogging mode, because air passing through the bypass passage 105, without containing water vapor evaporated from the surface of the interior heat exchanger 201, is blown toward the upper side of the vehicle and the windshield from the defroster opening 109, it can restrict air having a high humidity from being blown toward the windshield, and it can restrict the windshield from being fogged.

On the other hand, in the defogging mode, air containing a large water vapor, heated while passing through the interior heat exchanger 201, is blown toward the lower side of the passenger from a foot air outlet of the foot opening 111. Therefore, the heating capacity of the interior heat exchanger 201 can be made maximum, while it can restrict the windshield from being fogged.

In the first embodiment of the present invention, when the operation is switched to the heating operation from the cooling operation, the defrosting operation or the dehumidifying operation, the defogging mode is performed, so that it can prevent the windshield from being fogged while it can restrict the heating capacity from being reduced.

In FIG. 1, air passing through the first bypass passage 105 is supplied to the upper side in the passenger compartment from the defroster opening 109. However, the air passing through the first bypass passage 105 can be supplied to the upper side in the passenger compartment from the face opening 110.

In the first embodiment of the present invention, in the defogging mode, the bypass door 106 fully opens the first bypass passage 105. Therefore, the air passage of the heater 107 is partitioned into the first passage part communicating with the first bypass passage 105, and the second passage part communicating with the interior heat exchanger 201. Further, the opening degree of the second air mixing door 106 is adjusted so that a part of air passing through the first bypass passage 105 passes through the second bypass passage 108, and the other part of air passing through the first bypass passage 105 passes through the first passage part of the heater 107. Therefore, air to be blown toward the upper side in the passenger compartment can be heated to a suitable temperature while having a low humidity. Accordingly, it can prevent the heating degree of air blown toward the upper side in the passenger compartment from being insufficient, while it can sufficiently prevent the windshield from being fogged due to air blown toward the upper side in the passenger compartment.

Further, the air passing through the interior heat exchanger 201 is reheated in the heater 107. Therefore, the heating capacity for heating the passenger compartment can be sufficiently increased, and the relative humidify of air passing through the interior heat exchanger 201 can be reduced. Accordingly, it can further prevent the windshield from being fogged.

If the air passing through the first bypass passage 105 and the air passing through the interior heat exchanger 201 are mixed, water vapor contained in air to be blown toward the windshield of the passenger compartment is increased, and the defogging effect of the windshield is deteriorated. In the first embodiment, the first guide wall 115 and the partition door 120 are disposed so that air passing through the first bypass passage 105 and air passing through the interior heat exchanger 201 are not mixed from each other. Accordingly, in the defogging mode, air passing through the first bypass passage 105 flows toward the upper side of the passenger compartment through at least one of the defroster opening 109 and the face opening 110 while being suitably heated in the first passage part of the heater 107. Simultaneously, air passing through the interior heat exchanger 201 flows toward the lower side of the passenger compartment through the foot opening 111 while being heated in the second passage past of the heater 107. Thus, the defogging capacity of the windshield can be improved, and the heating capacity of the passenger compartment can be improved.

Further, the outside air introduction mode for introducing outside air having a small relative humidity is set in the defogging mode. Therefore, it can further prevent the windshield from being fogged.

After the predetermined time passes after the defogging mode starts, the normal heating operation shown in FIG. 4 can be performed.

Figure 5:
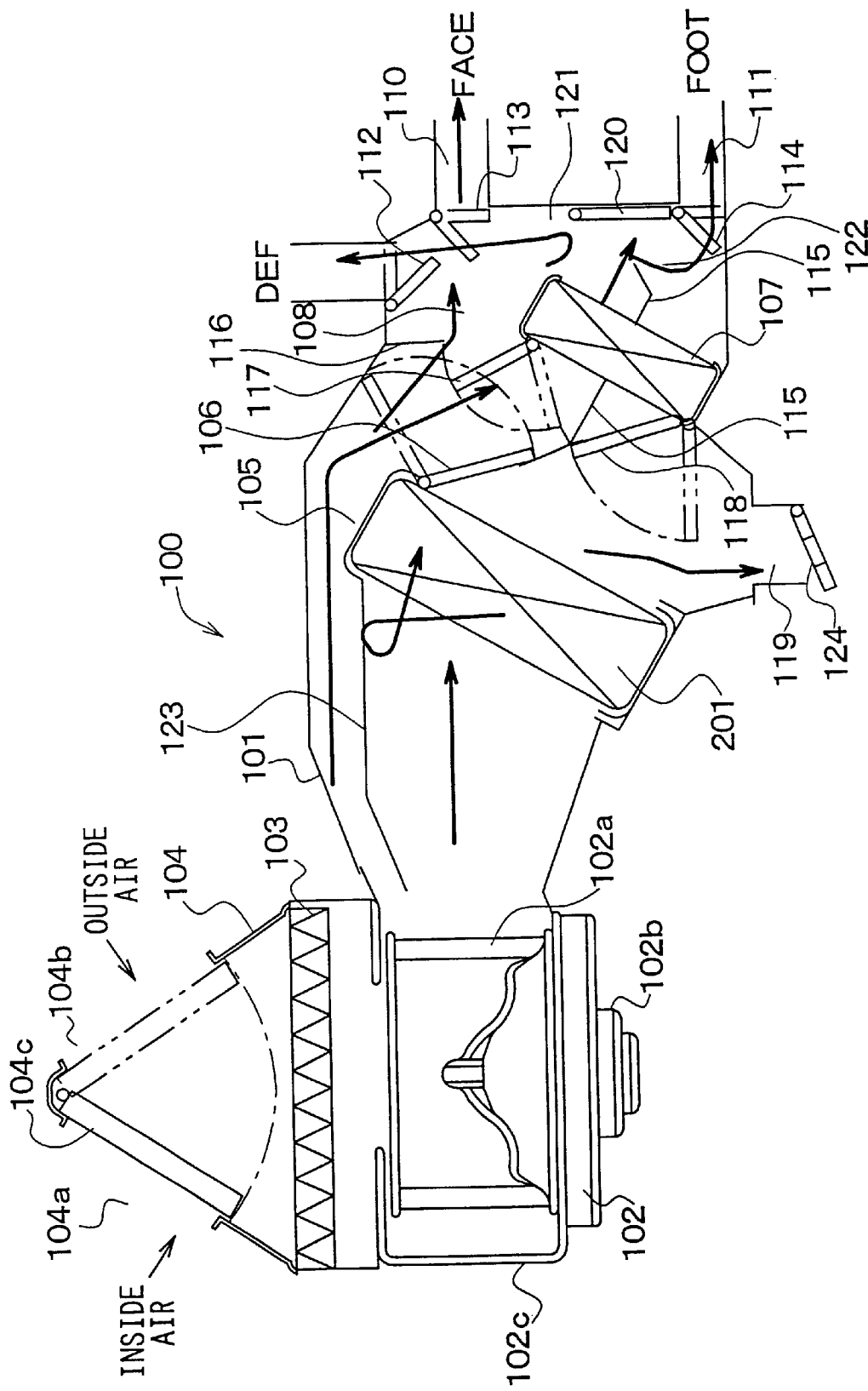
FIG. 5 is a schematic diagram of an air conditioner for a vehicle, in a defogging mode, according to a second embodiment of the present invention.

A second preferred embodiment of the present invention will be now described with reference to FIG. 5. In the above-described first embodiment, in the defogging mode, air passing through the interior heat exchanger 201 is supplied to the lower side in the passenger compartment. However, in the second embodiment, as shown in FIG. 5, when the defogging mode is set, air passing through the interior heat exchanger is discharged outside the passenger compartment through the drain port 119 at least for a predetermined time after the defogging mode starts. Further, a flow prevention wall 123, for preventing air around the interior heat exchanger 201 from flowing into the first bypass passage 105, is provided in the air conditioning case 101, as shown in FIG. 5.

Further, in the second embodiment, as shown in FIG. 5, because air passing through the interior heat exchanger 210 is discharged to the outside the passenger compartment, the opening area of the drain port 119 is made larger. In addition, a pressure difference valve 124 is disposed to open and close the drain port 119. When a pressure difference at the drain port 119 between an inner side and an outer side of the air conditioning case 101 becomes larger than a predetermined pressure, the pressure difference valve 124 opens the drain port 119.

According to the second embodiment of the present invention, when the defogging mode is set, the air passing through the interior heat exchanger 201 is discharged outside the passenger compartment through the drain port 119 at least for a predetermined time in the defogging mode. Therefore, it can effectively prevent air having a large water vapor from being blown into the passenger compartment.

In the second embodiment, the air passing through the interior heat exchanger 201 can be always discharged outside the passenger compartment in the defrosting mode. Alternatively, when the operation is switched to the heating operation from the cooling operation or the defrosting operation, the defogging mode described in the first embodiment can be performed, after the air passing through the interior heat exchanger 201 is discharged outside the passenger compartment through the drain port 119 for a predetermined short time.

For the predetermined time where the air passing through the interior heat exchanger is discharged outside the passenger compartment through the drain port 119 in the defogging mode, the door 120 is opened so that the passages 121, 122 communicate with each other.

In the second embodiment, while the air passing through the interior heat exchanger 201 is discharged outside the passenger compartment through the drain port 119 in the defogging mode, the heating capacity of the interior heat exchanger 201 is made maximum, so that condensed water on the interior heat exchanger 201 can be rapidly discharged outside the passenger compartment for a short time. Therefore, the predetermined time for which the air passing through the interior heat exchanger 201 is discharged outside the passenger compartment can be made shorter. After the defogging mode is performed for a short time, the normal heating operation can be performed by the maximum capacity. As a result, in the second embodiment, it can accurately prevent the windshield from being fogged without largely reducing the heating capacity of the passenger compartment.

In the second embodiment, the other parts are similar to those of the above-described first embodiment, and the detail explanation thereof is omitted.

Figure 6:
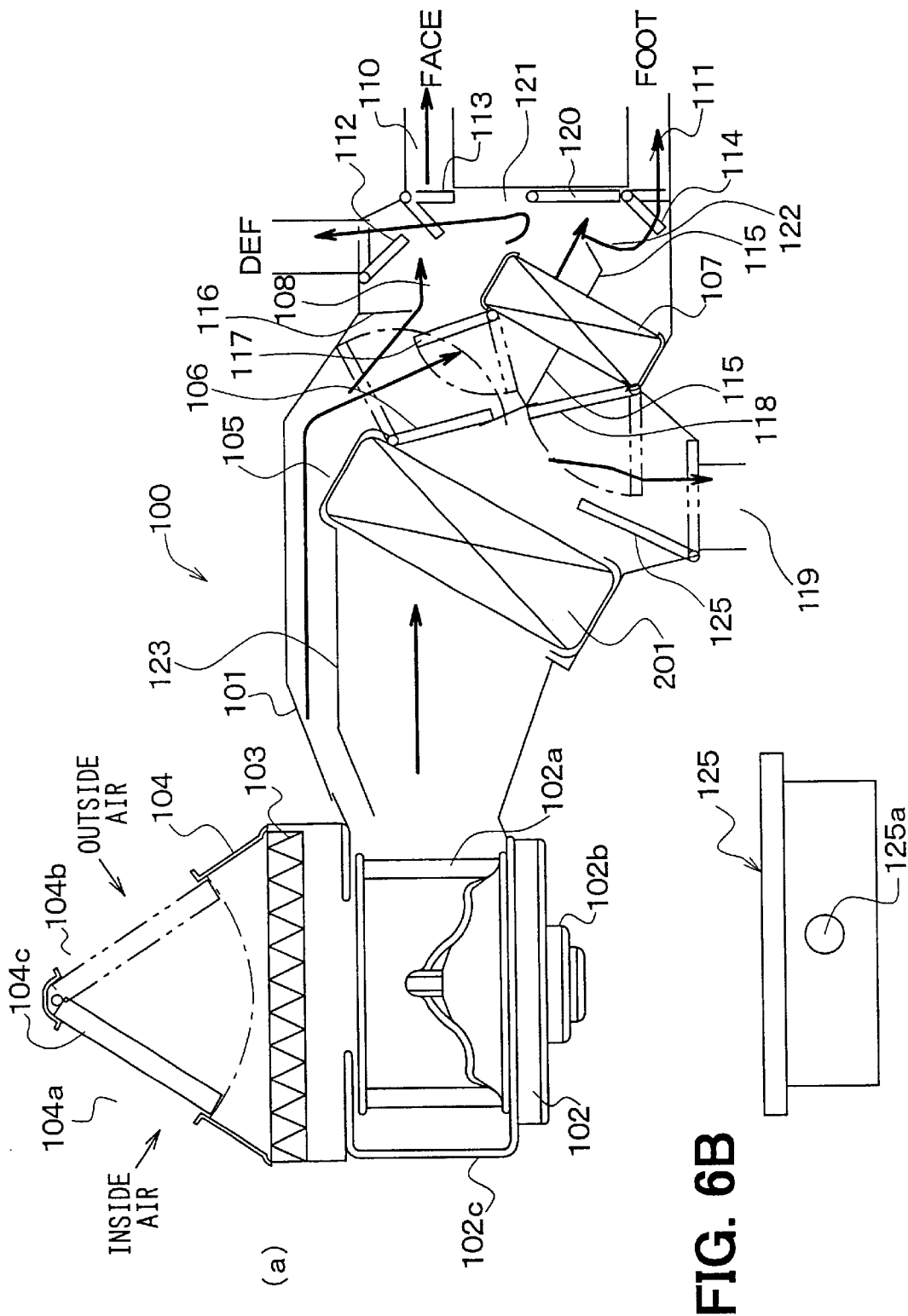
FIG. 6A is a schematic diagram of an air conditioner for a vehicle, in a defogging mode, according to a third embodiment of the present invention.
FIG. 6B is a front view of a switching valve.

A third embodiment of the present invention will be now described with reference to FIGS. 6A and 6B. The third embodiment is a modification of the above-described second embodiment. In the third embodiment, instead of the pressure difference valve 124 described in the second embodiment, a switching door (switching valve) 125 controlled by the ECU 212 is disposed to open and close the drain port 119. The switching door 125 (opening/closing door) has a communication hole 125a (though hole) through which an interior of the air conditioning case 101 always communicates with the drain port 119 even when the switching door 125 closes the drain port 119.

In the third embodiment, in an operation except for the defogging mode, the drain port 119 is closed by the switching door 125, so that noise outside the air conditioning case 101 from being transmitted to the passenger compartment. Even in this case, water in the air conditioning case 101 can be discharged through the communication hole 125a provided in the switching door 125. In the third embodiment, the other parts are similar to those of the above-described second embodiment.

Figure 7:
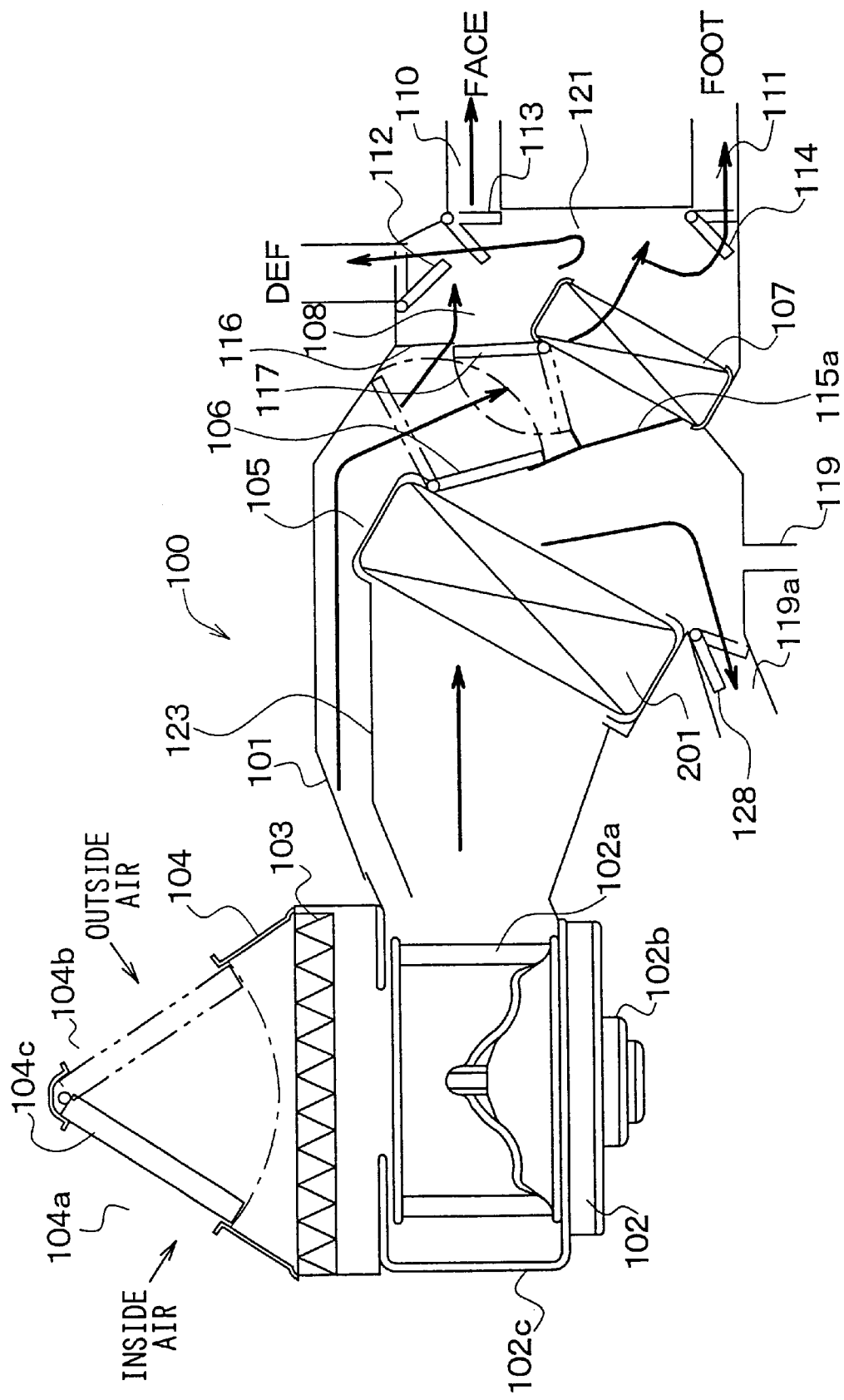
FIG. 7 is a schematic diagram of an air conditioner for a vehicle, in a defogging mode, according to a fourth embodiment of the present invention.

A fourth embodiment of the present invention will be now described with reference to FIG. 7. In the third embodiment, as shown in FIG. 7, the first guide wall 115, the partition door 120 and the second air mixing door 118 in the above-described first embodiment are omitted. In the fourth embodiment, an air discharge port 119a different from the drain port 119 is additionally formed so that air passing through the interior heat exchanger 201 can be discharged outside the passenger compartment through the discharge port 119 in the defogging mode. Further, the discharge port 119 is opened and closed by a switching door 128 controlled by the ECU 212. Further, instead of the second air mixing door 118, a partition wall 115a is disposed as shown in FIG. 7.

In the fourth embodiment, when the defogging mode is set, the switching door 128 opens the discharge port 119a at least for a predetermined time. Further, in the defogging mode, the bypass door 106 fully opens the first bypass passage 105, so that air passing through the first bypass passage 105 and air passing through the interior heat exchanger 201 are partitioned from each other by the bypass door 106 and the partition wall 115a. Accordingly, in the defogging mode, the condensed water on the interior heat exchanger 201 can be rapidly evaporated by the heating capacity of the interior heat exchanger 201, and air including the evaporated water vapor can be rapidly discharged outside the passenger compartment through the discharge port 119a. Accordingly, it can accurately prevent the windshield from being fogging in the defogging mode.

In the fourth embodiment, the other parts are similar to those of the above-described first embodiment, and the detail explanation thereof is omitted.

Figure 8:
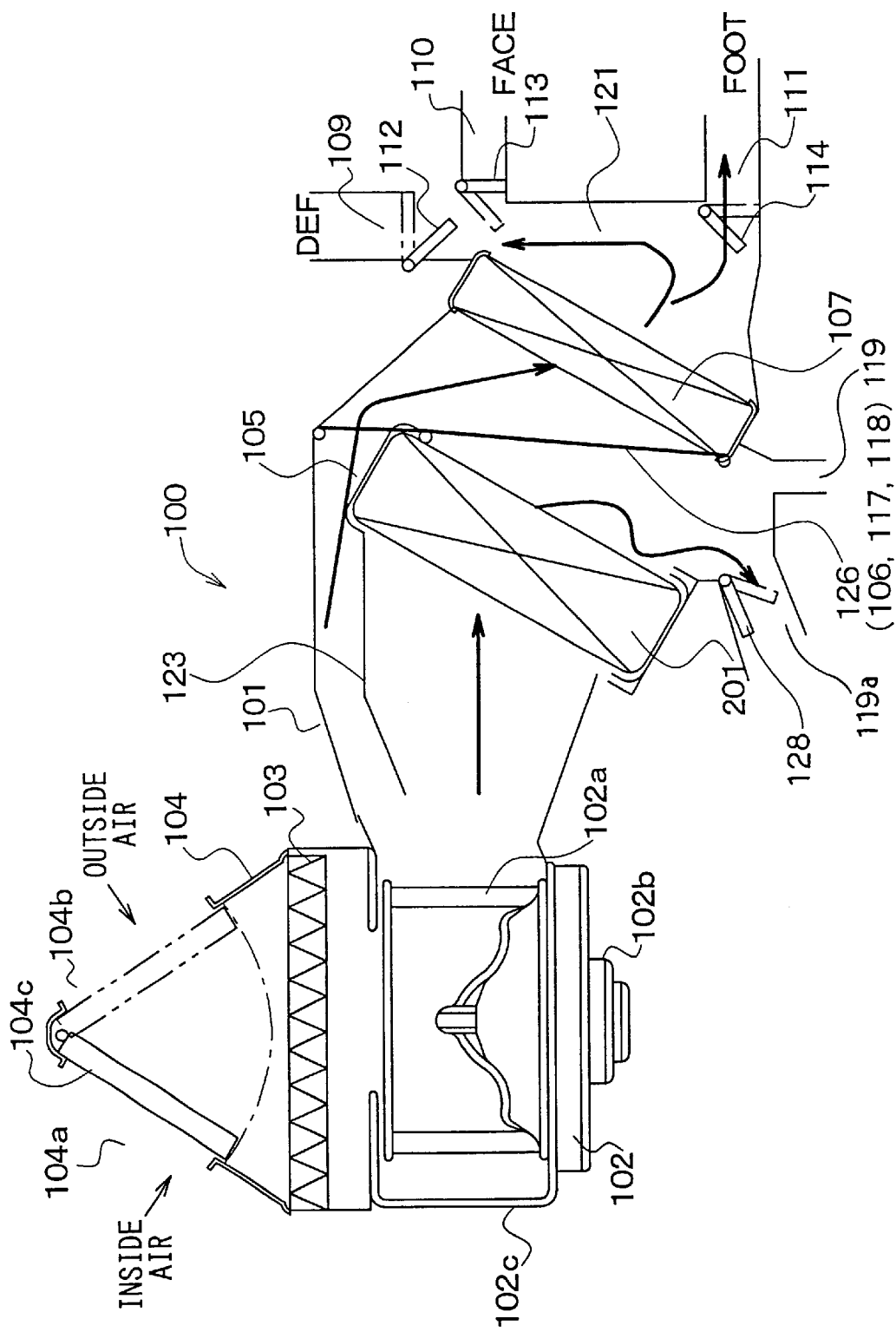
FIG. 8 is a schematic diagram of an air conditioner for a vehicle, in a defogging mode, according to a fifth embodiment of the present invention.

A fifth preferred embodiment of the present invention will be now described with reference to FIG. 8. In the above-described embodiments, each of the first and second air mixing doors 117, 118 and the bypass door 106 is formed into a plate door. However, in the fifth embodiment, the first and second air mixing doors 117, 118 and the bypass door 106 are formed by a film door 126 having plural openings through which air passes. Further, the second bypass passage 108 is not provided. In addition, the discharge port 119a for discharging air outside the passenger compartment and the switching door 128 described in the fourth embodiment are provided, and the partition wall 123 described in the fourth embodiment is also provided. Even in this case, in the defogging mode, air passing through the interior heat exchanger 201, having a high relative humidity, can be discharged outside the passenger compartment from the air conditioning case 101 through the discharge port 119a.

Figure 9:
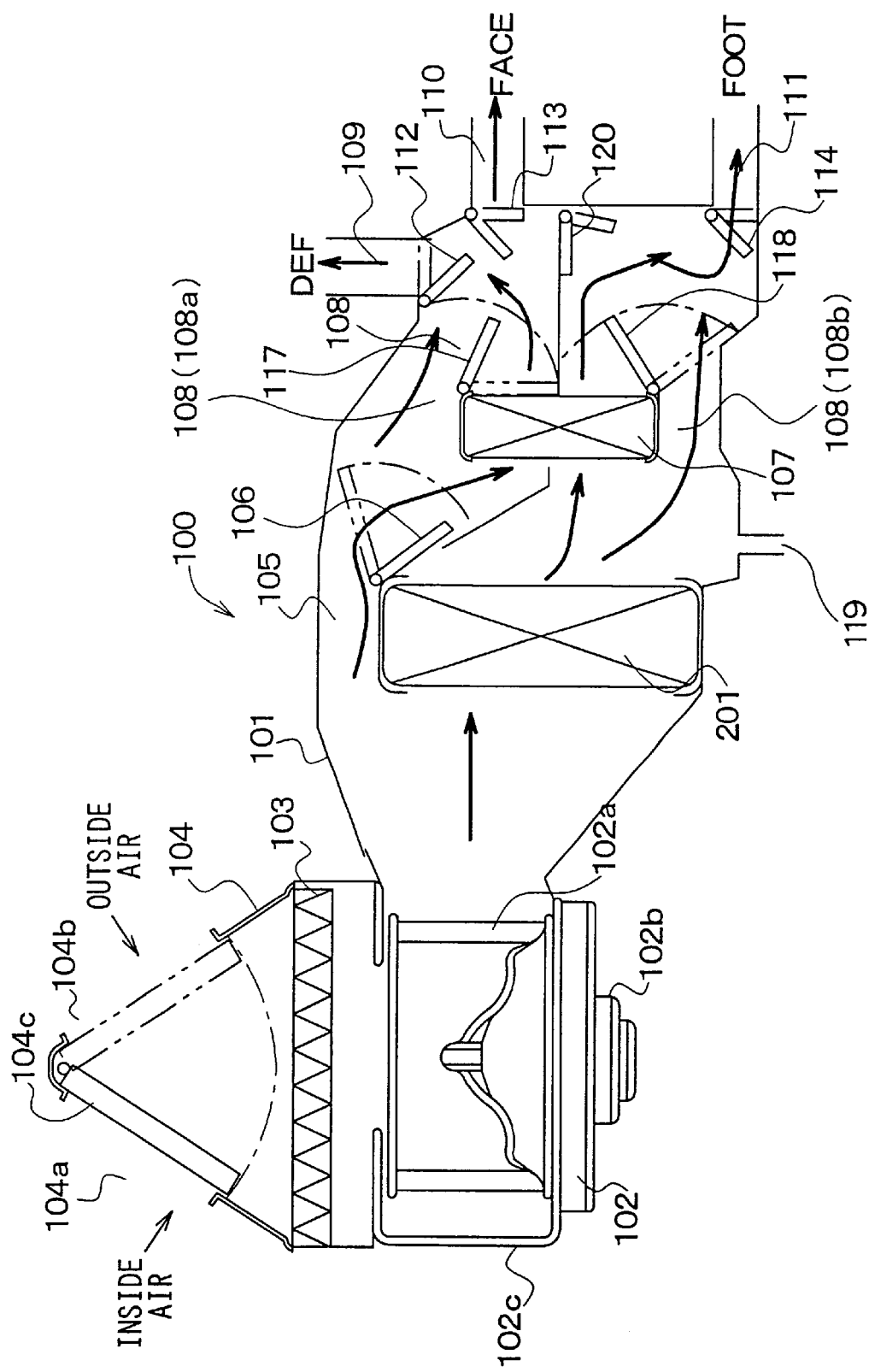
FIG. 9 is a schematic diagram of an air conditioner for a vehicle, in a defogging mode, according to a sixth embodiment of the present invention.

A sixth preferred embodiment of the present invention will be now described with reference to FIG. 9. In the above-described first embodiment of the present invention, the second bypass passage 108 is provided at one side of the heater 107, on a direct downstream side of the first bypass passage 105. However, in the sixth embodiment, the second bypass passage 108 through which air bypasses the heater 107 is constructed by two bypass passages 108a and 108b at both sides of the heater 107. That is, one bypass passage 108a is provided at the side of the first bypass passage 105, and the other bypass passage 108b is provided at a side opposite to the first bypass passage 105. Further, the first air mixing door 117 is disposed to open and close the first passage part of the heater 107 and the one bypass passage 108a, and the second air mixing door 118 is disposed to open and close the second passage part of the heater 107 and the other bypass passage 108b. Accordingly, even in the defogging mode, a part of the air passing through the interior heat exchanger 201 can flow through the second passage part of the heater 107, and the other part of the air passing through the interior heat exchanger 201 can flow through the bypass passage 108b while bypassing the heater 107. Further, the flow ratio of air passing through the second passage part of the heater 107 and air passing through the bypass passage 108b is adjusted by the second air mixing door 118. Similarly, in the defogging mode, a part of the air passing through the first bypass passage 105 flows through the first passage part of the heater 107, and the other part of the air passing through the first bypass passage 105 flows through the one bypass passage 108a. Further, the flow ratio of air passing through the first passage part of the heater 107 and air passing through the one bypass passage 108a is adjusted by the first air mixing door 117.

In the sixth embodiment, the other parts are similar to those of the above-described first embodiment, and the detail description thereof is omitted.

Figure 10:
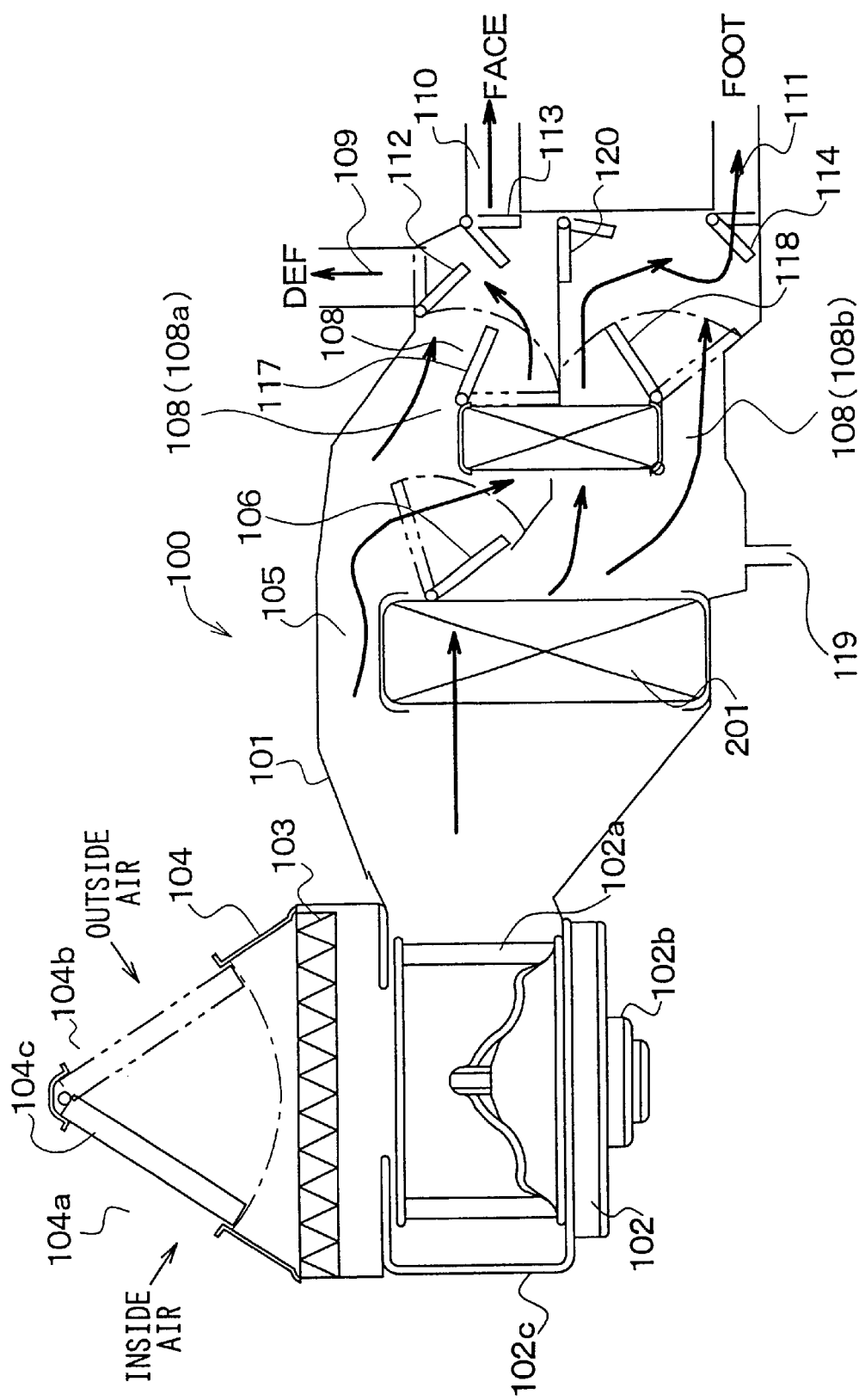
FIG. 10 is a schematic diagram of an air conditioner for a vehicle, in a defogging mode, according to a seventh embodiment of the present invention.

A seventh embodiment of the present invention will be now described with reference to FIG. 10. In the above-described sixth embodiment of the present invention, a rotation shaft of the bypass door 106 is disposed at a position so that the bypass door 106 are used only for opening and closing the first bypass passage 105. However, in the seventh embodiment, the rotation shaft of the bypass door 106 is shifted from the position shown in FIG. 9 to a lower side position as shown in FIG. 10, so that a part of the core surface of the interior heat exchanger 201 is opened and closed by the bypass door 106. Accordingly, when the bypass door 106 is fully opened as shown in FIG. 10, a small part of air passing through interior heat exchanger 201 flows into the side of the first bypass passage 105. Accordingly, in the defogging mode, the small part of air passing through the interior heat exchanger 201 is introduced into the upper side of the passenger compartment together with air passing through the first bypass passage 105. However, in this embodiment, the sectional area of the first bypass passage 105 can be made smaller, and the size of the air conditioning case 101 can be made smaller.

An eighth embodiment of the present invention will be now described with reference to FIGS. 11 and 12. In the eighth embodiment, the present invention is typically applied to an air conditioner with a double-layer flow structure. In the eighth embodiment, the air passage of the air conditioning case 101 is partitioned into to first and second air passages 101a and 101b by a partition plate 110c. When a double-layer flow mode is set, outside air flows through the first air passage 101a, and inside air flows through the second air passage 101b. The first bypass passage 105 is provided in the first air passage 101a through which outside air flows in the double-layer flow mode.

Further, an inside air suction port 104d for only introducing inside air is provided. In addition, similarly to the fourth embodiment, the discharge port 119a and the switching door 128 are provided.

Figure 11:
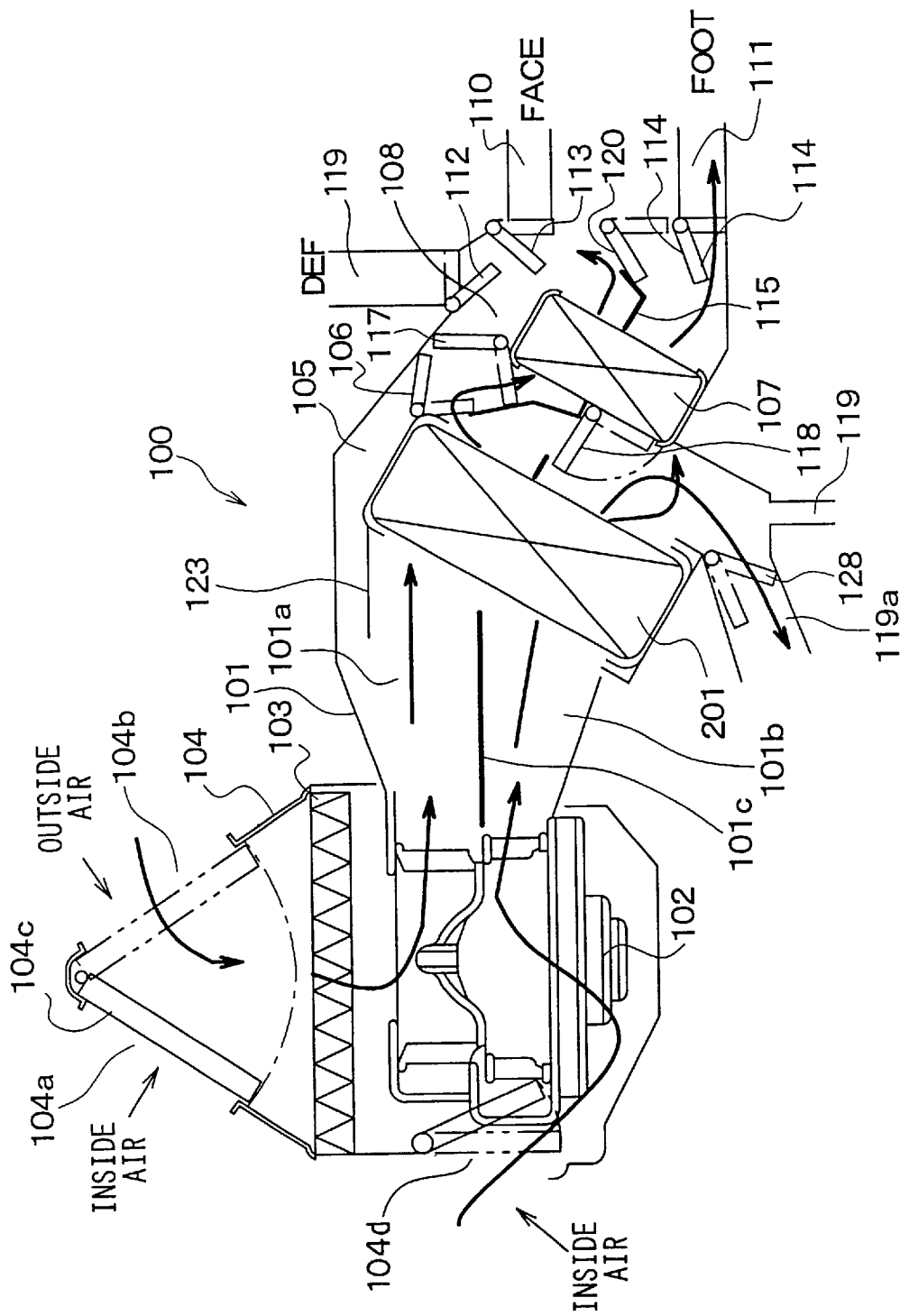
FIG. 11 is a schematic diagram of an air conditioner for a vehicle, showing an operation state in a defogging mode, according to an eighth embodiment of the present invention.

FIG. 11 shows a state in the defogging mode. The double-layer flow mode is set at a maximum heating state immediately after a start of the vehicle in the winter, for example. In the double-layer flow mode, inside air, having a relatively high temperature, introduced from the inside air suction port 104d is introduced toward the lower side in the passenger compartment from the foot opening 111, through the second air passage 101b after being heated by the interior heat exchanger and the heater 107. On the other hand, outside air, having a low humidity, introduced from the outside air suction port 104b flows toward the upper side in the passenger compartment from the face opening 110 or/and the defroster opening 119, through the first air passage 101a after being suitably heated in the interior heat exchanger 201 and the heater 107. In this case, because the first bypass passage 105 and the second bypass passage 108 are provided in the first air passage 101a, by suitably adjusting the opening degrees of the doors 106, 117, the low-temperature and low-humidity air can be blown into the defroster opening 119 and the face opening 110. In the maximum heating state, the lower side of the passenger compartment can be quickly heated, while it can prevent the upper side of the passenger compartment from having a hot feeling. Further, the defogging mode is set when it is determined that the windshield tends to be fogged. As described in the first embodiment, the defogging mode is set when the operation of the heat pump refrigerant cycle is switched from the cooling operation or the defrosting operation to the heating operation, for example. In the defogging mode, as shown in FIG. 11, the discharge port 119a can be opened for a short time so that air passing through a part (lower part) of the interior heat exchanger is discharged outside the passenger compartment through the discharge port 119a.

Figure 12:
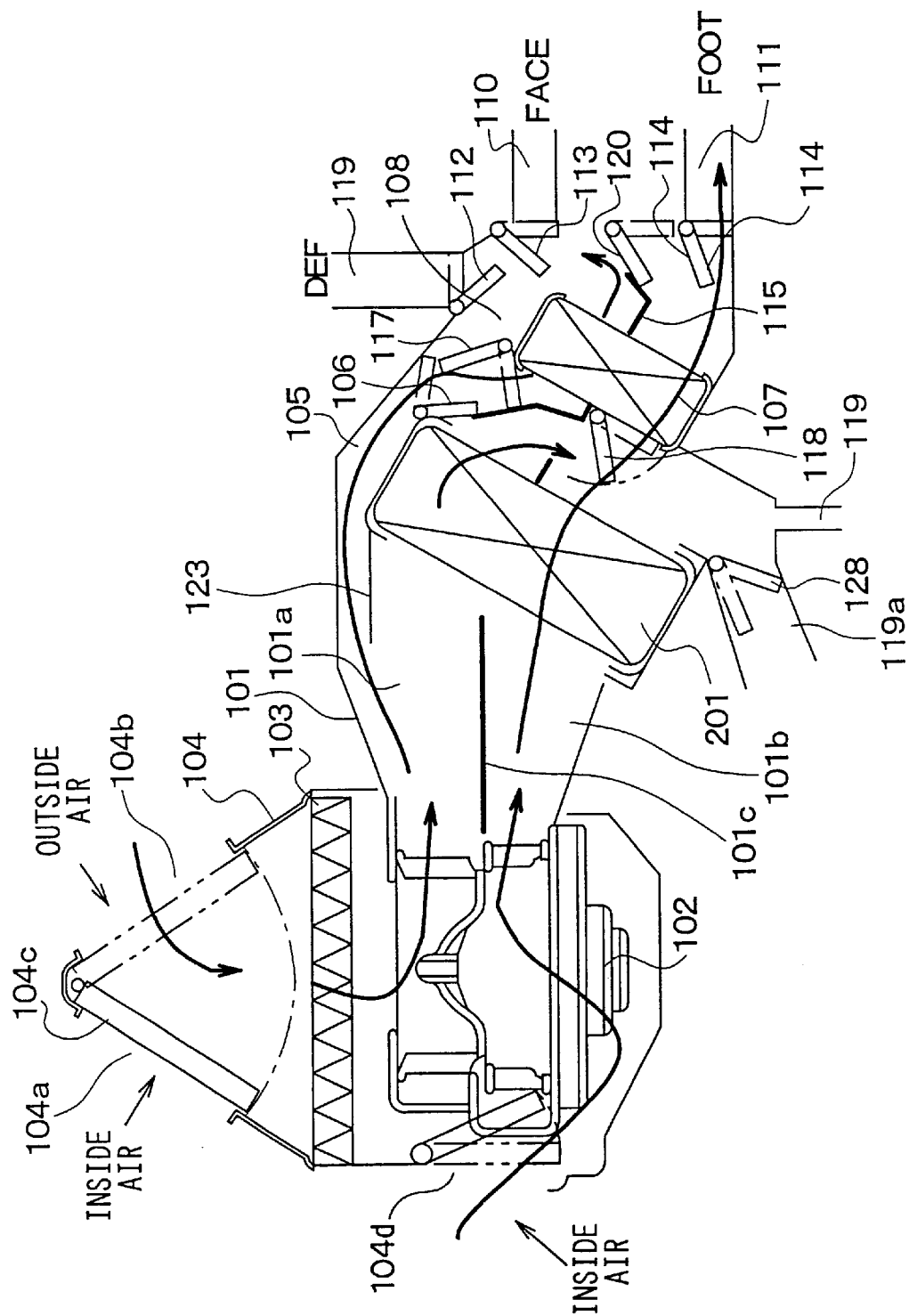
FIG. 12 is a schematic diagram of the vehicle air conditioner, showing an another operation state in the defogging mode, according to the eighth embodiment.

Further, in the defogging mode, the doors of the air conditioner can be positioned as shown in FIG. 12. In this case, the low-humidity outside air introduced from the outside air introduction port 104b flows toward the upper side in the passenger compartment from the defroster opening 119 and the face opening 110, through the first bypass passage 105, while bypassing the interior heat exchanger 201. On the other hand, inside air introduced from the inside air suction port 104d flows toward the lower side in the passenger compartment from the foot opening 111 through the second air passage 101b after passing through the interior heat exchanger 201. Even in this case, the discharge port 119a can be opened for a short time in the defogging mode.

Although the present invention has been fully described in connection with the preferred embodiments thereof with reference to the accompanying drawings, it is to be noted that various changes and modifications will become apparent to those skilled in the art.

For example, in the above-described embodiments of the present invention, the first bypass passage 105 is provided in the air conditioning case 101 at an upper side of the interior heat exchanger 201. However, the first bypass passage 105 can be provided at the other position. For example, the first bypass passage 105 can be provided adjacent to a side surface of the interior heat exchanger 201.

In the above-described embodiments of the present invention, air passing through the first bypass passage 105 and air passing through the interior heat exchanger 201 are heated using the single heater 107. However, the present invention can be applied to an air conditioner where one heater for heating air passing through the first bypass passage 105 and another heater for heating air passing through the interior heat exchanger 201 are provided.

In the above-described embodiments, the heater 107 heats air using the engine-cooling water as the heating source. However, a heater such as an electrical heater, and an exhaust gas heater using an exhaust gas generated in the vehicle as the heating source can be also used. For example, air passing through the heater 107 can be heated using exhaust heat of the engine as the heating source.

In the above-described embodiments of the present invention, refrigerant directly flows into the interior heat exchanger 201 to directly heat and cool air to be blown into the passenger compartment. However, a secondary refrigerant such as water and alcohol can be introduced into the interior heat exchanger 201, and air to be blown into the passenger compartment can be heated and cooled by heating and cooling the secondary refrigerant in the interior heat exchanger 201.

In the above-described embodiments of the present invention, the compressor 202 is driven by the electrical motor. However, the compressor 202 can be driven by the engine through a power transmitting member such as a V-belt.

Further, in the above-described embodiments of the present invention, the heat pump refrigerant cycle 200 can be constructed to absorb heat from exhaust heat of the vehicle, to absorb heat from the engine-cooling water, or to absorb heat from the exhaust gas of the engine.

Such changes and modifications are to be understood as being within the scope of the present invention as defined by the appended claims.

What is claimed is:

1. An air conditioner for a vehicle having a passenger compartment, comprising:

an air conditioning case defining an air passage through which air flows into the passenger compartment; and a heat exchanger for performing a heat exchange with air to be blown into the passenger compartment, the heat exchanger being disposed in the air conditioning case to form a bypass passage through which air flows to a downstream side while bypassing the heat exchanger, wherein:

the heat exchanger is an interior heat exchanger of a heat pump refrigerant cycle, the interior heat exchanger being disposed in the heat pump refrigerant cycle to radiate heat to and to absorb heat from the air to be blown into the passenger compartment; and in a defogging mode, air mainly passing through the bypass passage is blown toward a first area in the passenger compartment, near a windshield of the vehicle, and air mainly passing through the heat exchanger is blown toward a second area in the passenger compartment, separated from the windshield.

2. The air conditioner according to claim 1, wherein:
the air conditioning case has a defroster opening from which air mainly passing through the bypass passage is blown toward the windshield in the defogging mode.

3. The air conditioner according to claim 1, wherein:
in the defogging mode, air mainly passing through the heat exchanger is blown toward the lower side of the passenger compartment.

4. The air conditioner according to claim 1, wherein:
at least in the defogging mode, air outside the passenger compartment is mainly introduced into the bypass passage.

5. The air conditioner according to claim 1, further comprising:
a partition member for partitioning the air passage within the air conditioning case into a first passage through which air outside the passenger compartment flows into the passenger compartment, and a second passage through which air inside the passenger compartment flows into the passenger compartment, wherein:
the bypass passage is provided in the first passage.

6. The air conditioner according to claim 1, further comprising
a heater, disposed in the air conditioning case at a downstream air side of the heat exchanger, for heating air after passing through the heat exchanger.

7. The air conditioner according to claim 1, further comprising
a heater, disposed in the air conditioning case at a downstream air side of the heat exchanger, for heating air after passing through the bypass passage.

8. The air conditioner according to claim 1, further comprising
a heater, disposed in the air conditioning case, for heating at least one of air after passing through the heat exchanger and air after passing through the bypass passage,
wherein the heater heats air passing therethrough using exhaust heat generated in the vehicle as a heating source.

9. The air conditioner according to claim 8, wherein the heater heats air using cooling water for cooling an engine of the vehicle as the heating source.

10. The air conditioner according to claim 8, wherein the heater heats air using exhaust gas generated in an engine of the vehicle as the heating source.

11. The air conditioner according to claim 1, wherein:
in the defogging mode, at least a part of air passing through the heat exchanger is discharged outside the passenger compartment from the air conditioning case.

12. The air conditioner according to claim 1, wherein:
a part of air passing through the heat exchanger is discharged outside the passenger compartment from the air conditioning case, at least for a predetermined time period in the defogging mode.

13. The air conditioner according to claim 11, wherein:
the air conditioning case has a drain port at a downstream bottom side of the heat exchanger, through which water in the air conditioning case is discharged to an outside; and
in the defogging mode, air after passing through the heat exchanger is discharged outside the passenger compartment through the drain port.

14. The air conditioner according to claim 11, wherein:
the air conditioning case has a discharge port through which air after passing through the heat exchanger is discharged outside the passenger compartment from the air conditioning case in the defogging mode.

15. The air conditioner according to claim 13, further comprising
a switching member disposed for opening and closing the drain port.

16. The air conditioner according to claim 14, further comprising
a switching member disposed for opening and closing the discharge port.

17. The air conditioner according to claim 16, wherein the switching member has a communication hole through which the discharge port always communicates with inside the air conditioning case.

18. The air conditioner according to claim 1, further comprising
an exterior heat exchanger of the heat pump refrigerant cycle, which performs a heat exchange with outside air to absorbs heat from the outside air and to radiate heat to the outside air.

19. The air conditioner according to claim 1, further comprising
a control unit for controlling operation of the heat pump refrigerant cycle to set a first operation where air passing through the heat exchanger is cooled and dehumidified, and a second operation where air passing through the heat exchanger is heated; and
the control unit sets the defogging mode for a set time, when the operation of the heat pump refrigerant cycle is switched from the first operation to the second operation.

20. The air conditioner according to claim 1, further comprising
means for forming a first air passage and a second air passage within the passenger compartment, in the defogging mode, wherein:
air passing through the bypass passage mainly flows toward the first area in the passenger compartment through the first air passage, and air passing through the heat exchanger mainly flows into the second area in the passenger compartment through the second air passage.

* * * * *